United States Patent [19]
Kanai et al.

[11] Patent Number: 5,457,511
[45] Date of Patent: Oct. 10, 1995

[54] SINGLE-LENS REFLEX CAMERA

[75] Inventors: Masaharu Kanai; Tokuji Sato, both of Saitama, Japan

[73] Assignee: Fuji Photo Film Co., Ltd., Kanagawa, Japan

[21] Appl. No.: 186,845

[22] Filed: Jan. 27, 1994

[30] Foreign Application Priority Data

Jan. 27, 1993 [JP] Japan ................................ 5-012047

[51] Int. Cl.$^6$ .................................................... G03B 19/12
[52] U.S. Cl. .......................... 354/154; 354/219; 354/288
[58] Field of Search .................................... 354/152, 154, 354/155, 158, 219, 224, 225, 288

[56] References Cited

U.S. PATENT DOCUMENTS

| | | | |
|---|---|---|---|
| 4,723,140 | 2/1988 | Whiteside et al. | 354/155 X |
| 5,001,505 | 3/1991 | Tosaka et al. | 354/288 |
| 5,227,822 | 7/1993 | Takahashi et al. | 354/288 |

FOREIGN PATENT DOCUMENTS

3-123329  5/1991  Japan .

*Primary Examiner*—Howard B. Blankenship
*Attorney, Agent, or Firm*—Young & Thompson

[57] ABSTRACT

A changeover mirror is disposed behind a taking lens and is movable between a photographic position on the optical path of the taking lens so as to reflect light passing through the taking lens, on the one hand, and a viewfinder position displaced from the optical path of the taking lens, on the other hand. A conversion lens which is mounted in the camera separately from the changeover mirror, is driven to be positioned on the optical path of the taking lens while the changeover mirror is in the viewfinder position. When the changeover mirror is in the photographic position, a blind member is positioned on the optical path of the viewfinder optics. The blind member shields the photographic optical path from extraneous light that enters through the eyepiece of the viewfinder optics. When the camera is set in a manual focus mode, a split micro prism is positioned in a focal plane of the viewfinder optics. With the split micro prism in place, manual focusing is performed by operating a manual focusing ring.

23 Claims, 6 Drawing Sheets

SINGLE-LENS REFLEX CAMERA

BACKGROUND OF THE INVENTION

1. Field of the Invention

The present invention relates to a single-lens reflex camera, and more particularly to a single-lens reflex camera for use with a photosensitive material having a large frame size such as an instant film.

2. Related Art

A single-lens reflex camera for use with monosheet type instant films is disclosed in JPA 3-123329. The monosheet type instant films, which enable one to see the result of photography immediately after the exposure, have a large frame size. The known single-lens reflex cameras have a Z-shaped optical path formed by a changeover mirror and a stationary mirror, so that a taking lens may be provided with a focal length long enough for the large instant film in a compact fashion. A conversion lens for the viewfinder is securely attached to the changeover mirror such that the changeover mirror may be inserted in the optical path of the taking lens concurrently with retraction of the conversion lens from the taking lens optical path without the need for a large space.

Because the changeover mirror must be moved at a high speed every exposure, a large power drive mechanism is necessary for swinging the mirror along with the heavy conversion lens at the high speed. Besides that, the high speed swinging movement of the mirror is suddenly stopped by the mirror striking against a stop. Therefore, a high stress is applied to the joint between the mirror and the conversion lens, so that the angle of the joint tends to change. Thus, the conventional mechanism has a problem of durability.

Moreover, in order to permit swinging of the changeover mirror, a slight gap is provided between the changeover mirror and a lens barrel of the taking lens when the changeover mirror is placed in the taking lens optical path. Therefore, light entering through an eyepiece of the viewfinder and traveling toward the changeover mirror may sometimes enter the photographic optical path through this gap, resulting in a reduced sharpness of the photographic image.

OBJECTS OF THE INVENTION

An object of the present invention is, therefore, to provide a single-lens reflex camera wherein the load on the changeover mirror drive mechanism is reduced to improve the durability of the camera.

Another object of the invention is to shield the taking lens optical path from extraneous light which may enter through the eyepiece and the gap around the changeover mirror, so as to improve the sharpness of the photographic image.

SUMMARY OF THE INVENTION

To achieve the above and other objects, in a camera having a changeover mirror disposed behind the taking lens and movable between a photographic position in which this mirror is disposed in the optical path of the taking lens, on the one hand, and a viewfinding position displaced from the optical path of the taking lens, on the other hand, the present invention provides a conversion lens which is separate from the changeover mirror. The conversion lens is movable and is inserted into the optical path of the taking lens while the changeover mirror is in the viewfinding position. When the conversion lens is in the optical path of the taking lens, that is, when the changeover mirror is in the viewfinding position, real image viewfinder optics including an eyepiece are made effective. When the changeover mirror is in the photographic position, a blind plate is inserted into the optical path of the viewfinder optics so as to shield the photographic optical path from light that enters through the eyepiece.

According to the present invention, since the conversion lens is separate from the changeover mirror, the load on the drive mechanism for driving the changeover mirror is reduced. Also the durability of the changeover mirror and the conversion lens is improved.

Since the blind plate is disposed in the optical path of the viewfinder optics when the changeover mirror is in the photographic position, extraneous light entering through the eyepiece is shielded from the photographic optical path.

BRIEF DESCRIPTION OF THE DRAWINGS

Other objects and advantages of the present invention will become apparent from the following detailed description of the preferred embodiments when read in connection with the accompanying drawings, wherein like reference numerals designate like or corresponding parts throughout the several views, and wherein.

DETAILED DESCRIPTION OF THE PREFERRED EMBODIMENT

Figures 1A, 1B:
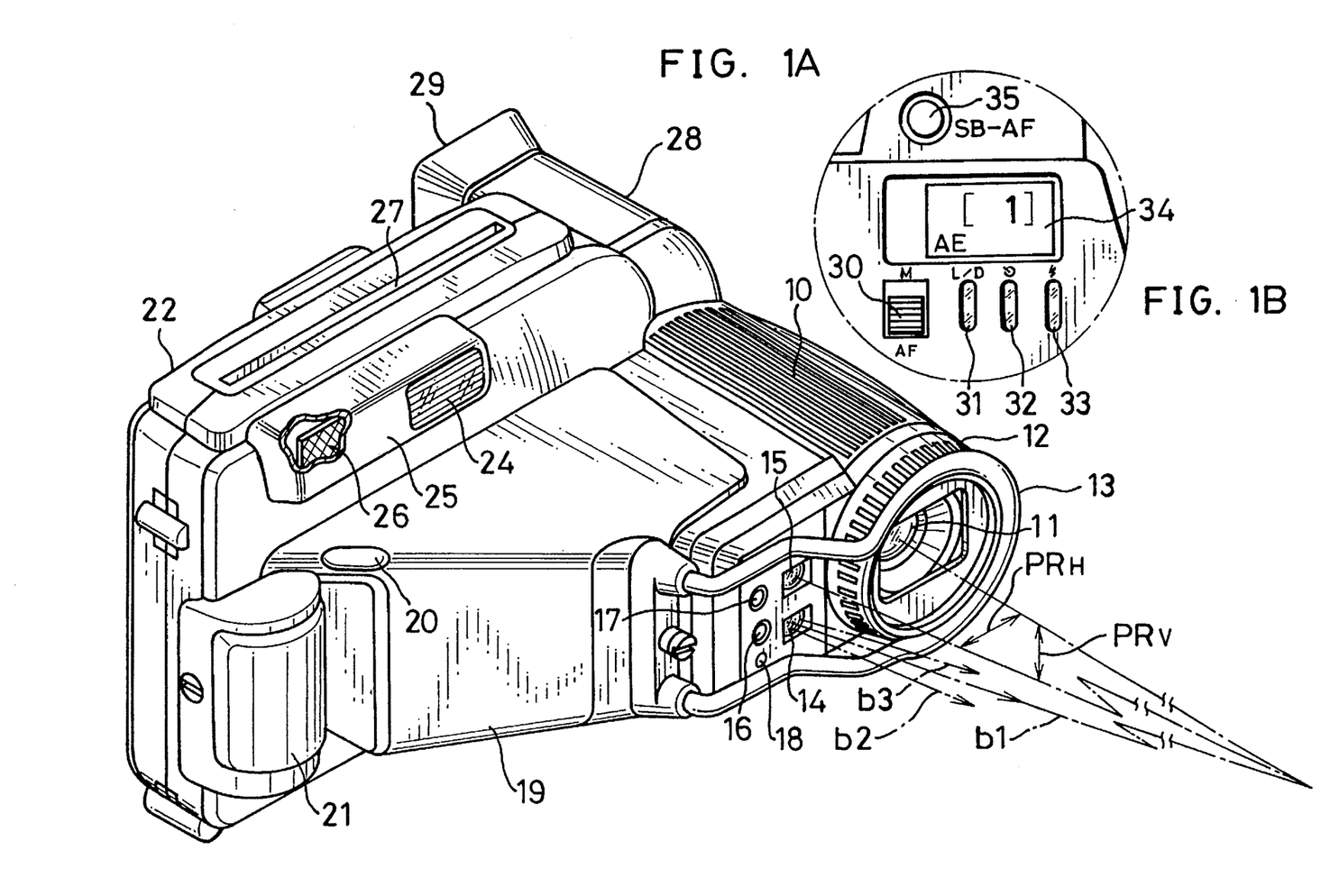
FIG. 1 is a perspective view of a single-lens reflex camera according to an embodiment of the present invention.

Referring to FIG. 1 showing a camera according to the present invention, a lens barrel 10 having a taking lens 11 is disposed on one side of the camera, which is the user's left side in the illustrated embodiment. The taking lens 11 has, for example, a focal length of 148 mm and an f-number of f12 at open aperture. A focusing ring 12 for manual focusing is disposed in front of the taking lens 11, and a lens protector 13 is disposed in front of the focusing ring 12. In the front of the camera on the left side of the taking lens as seen in FIG. 1, there are an AF light projection window 14 of an autofocus (AF) system, an AF light reception window 15 of the autofocus system, and AE light reception window 16 of an automatic exposure (AE) system, a light reception window 17 of an automatic flash system and a light emission diode (LED) display window 18 for emitting red light in cooperation with a self timer. A triangular mirror box 19 is disposed in a middle portion of the camera, and a shutter release button 20 is disposed on the mirror box at a left rear portion thereof as seen in FIG. 1. A grip 21, which is to be grasped by the right hand when using the camera, is disposed on the left side of the mirror box 19 in FIG. 1, that is, in the vicinity of the shutter release button 20. The grip 21 doubles as a power source box for holding a power source 21 a (see FIG. 3).

A film loading section 22 for loading monosheet-type instant films is disposed behind the mirror box 19. The monosheet-type instant film is a unit consisting of at least a photosensitive sheet having a photosensitive layer and an image receiving layer laminated on each other, and developing pods which seal developing solution therein. The instant film can be dealt with as a sheet throughout the photographic process. A plurality of sheets of such monosheet-type instant film is contained in a film pack, which is loaded in the film loading section 22 (see FIG. 3).

A flash-emitting portion 24 of a built-in flash unit is mounted in a box 25 disposed in the upper front of the film loading section 22. The box 25 also contains a diffusion plate 26 slidable therein so as to be automatically placed in front of a light source of the flash emitting portion 24 upon setting a close-up photography mode, thereby to diffuse and reduce the flash light to an amount appropriate for close-up photography. A film outlet 27 is formed on the top of the film loading portion 22 for ejecting an exposed one of the instant films.

A viewfinder section 28 is disposed on one side of the film loading section 22 behind the taking lens 12. An eye cup 29 is attached to an eyepiece end of the viewfinder section 28.

An enlarged fragment of the side wall of the viewfinder section 28 is shown encircled in FIG. 1, where there is seen a focus mode change switch 30 for changing over between an autofocus mode and a manual focus mode, an exposure control button 31 for controlling exposure value, a self-timer button 32, a flash mode button 33, a liquid crystal display panel 34 for displaying the number of taken pictures, battery charge conditions, and a selected one of various modes. Also an SB-AF button 35 is disposed on this side wall, which changes over from a multi-beam autofocus mode to a single-beam autofocus (SB-AF) mode only while the button is depressed.

The flash mode button 33 cyclically changes over various flash modes one after another upon each depression thereof. The various flash modes include, for example, an automatic flash mode, a daylight-synchronized flash mode, a flash off mode, a small aperture flash mode (f-number: f40, an external flash unit is attached), and an open aperture flash mode (f-number: f12, an external flash unit is attached).

The above-mentioned multi-beam autofocusing is such that three beams b1, b2 and b3 are projected toward three different points in a photographic field which are located, for example, horizontally spaced from one another, and the nearest distance of the three points is selected as the subject distance for focusing.

Figure 2:
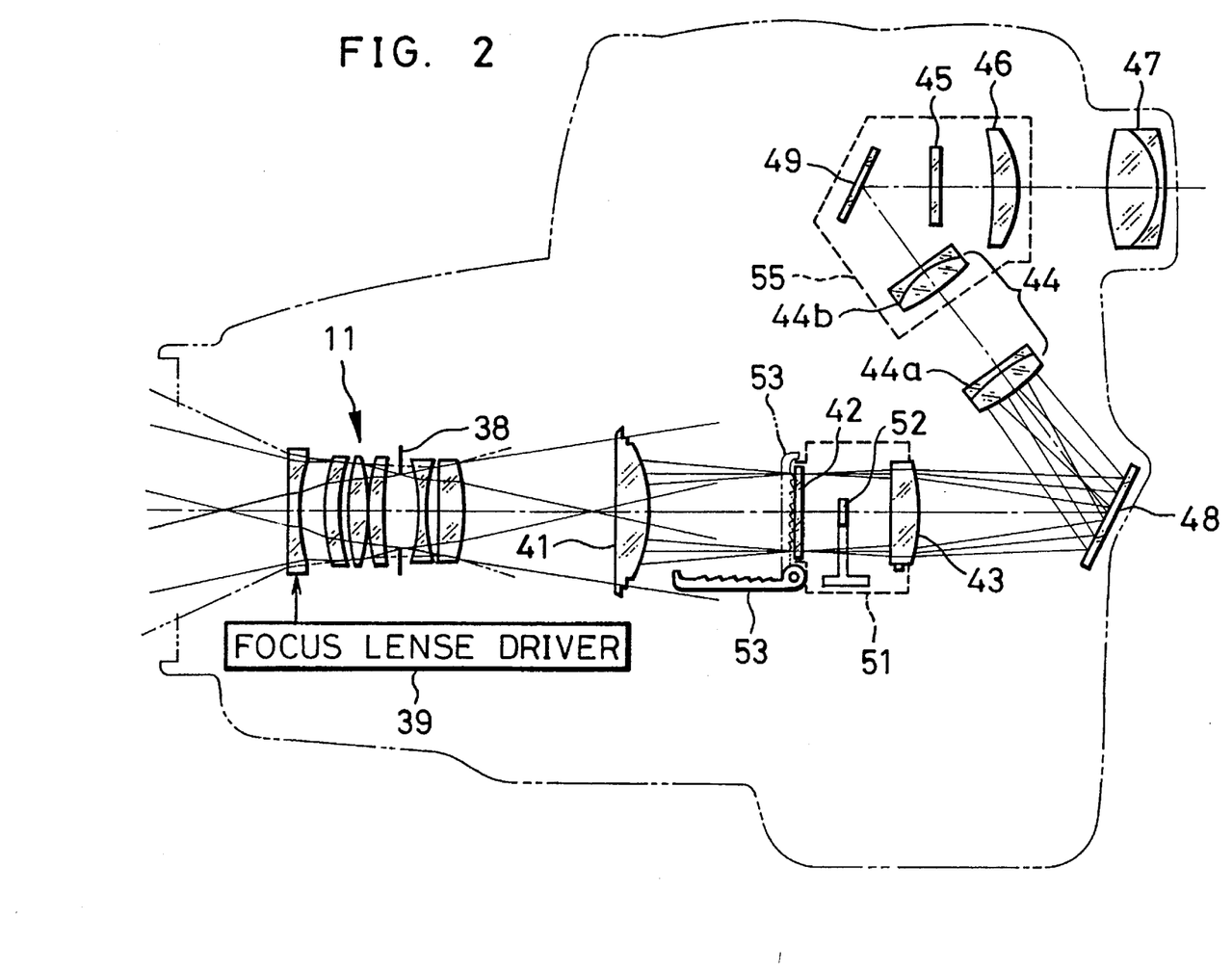
FIG. 2 is an explanatory view of the viewfinder optics of the single-lens reflex camera shown in FIG. 1.

Referring to FIG. 2 showing the viewfinder optics, a lens shutter 38 disposed in the middle of the taking lens 11 is opened when the viewfinder optical path is in use. A focus lens driver 39 is disposed below the taking lens 11, which moves the focusable lens elements in an axial direction so as to perform focusing in accordance with distance measurement data in the autofocus modes. A conversion lens 41, a first focusing screen 42, relay lenses 43 and 44, a second focusing screen 45, a convex lens 46, an eyepiece 47 and two stationary mirrors 48 and 49 are disposed behind the taking lens 11, thereby to constitute a real image viewfinder optical train. The conversion lens 41 is retractable from the optical path of the taking lens 11 when switching to photographic optical path shown in FIG. 3.

Figure 4:
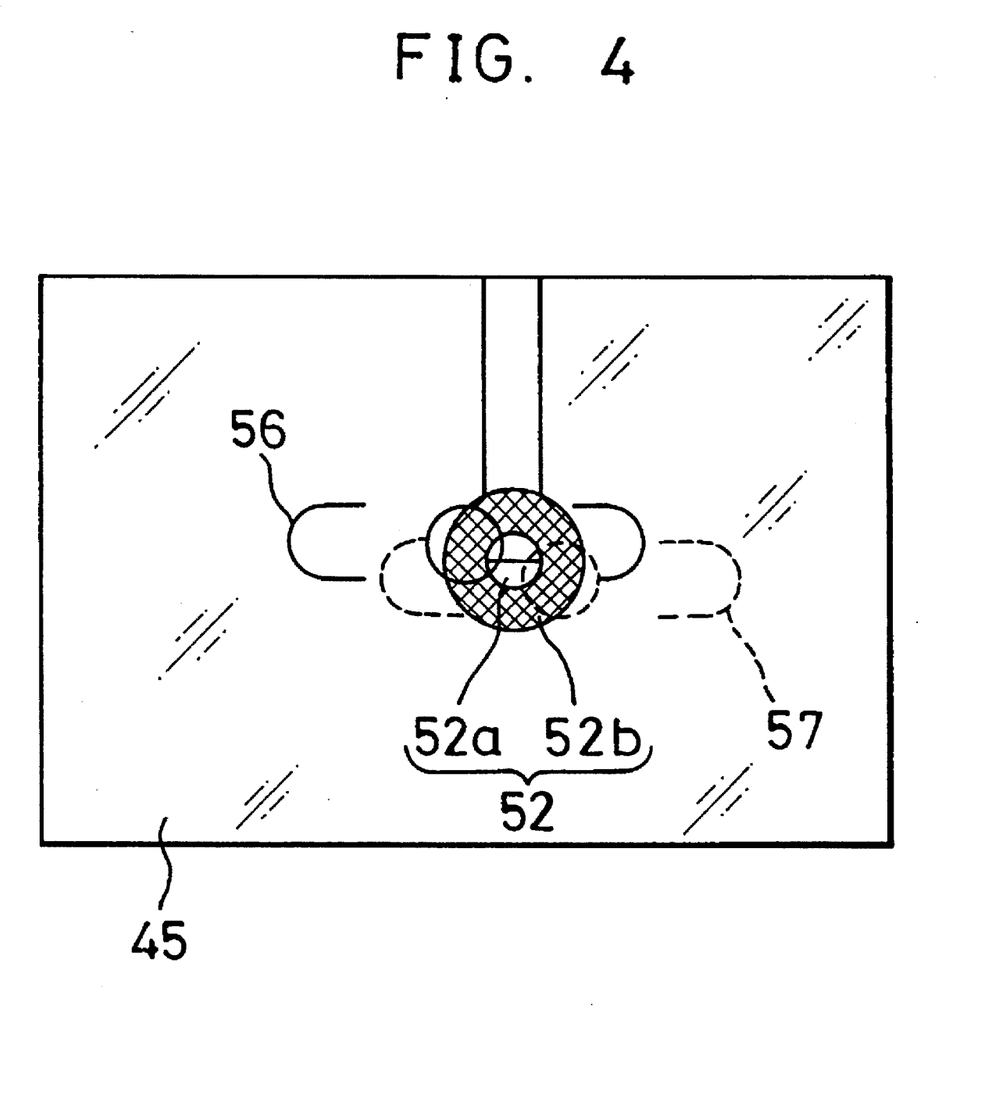
FIG. 4 is an explanatory view of several focusing areas displayed in a field of a viewfinder for use in autofocusing and a split macro prism for use in manual focusing.

The first focusing screen 42 and the relay lens 43 are mounted in a dust-proof box 51 in a dust-free fashion. In the box 51, a split micro prism 52 is pivotally mounted which is inserted in the optical path when the manual focus mode is selected by the focus mode change switch 30. The split micro prism 52 is comprised by a split image prism 52a, and micro prisms 52b surrounding the split image prism 52a, as shown in FIG. 4. As is well-known in the art, an image of a subject viewed through the split image prism 52a, which is split into upper and lower halves, is brought into alignment when the taking lens 11 is focused on the subject. Simultaneously therewith, the circumferential portion of the image viewed through the micro prisms 52b appears clearly so that the photographer can with certainty recognize the in-focus condition.

A blind plate 53 is pivotally mounted on the front of the box 51. The blind plate 53 is out of the optical path as indicated by solid lines in FIG. 2 unless the shutter release button 20 is depressed for an exposure. As is indicated by dashed lines, the blind plate 53 is disposed in front of the first focusing screen 42 when the photographic optical path is to be established, so that extraneous light entering through the eyepiece 47 and traveling toward the changeover mirror may not reach the taking lens optical path.

The second relay lens 44 is constituted by two doublet lenses 44a and 44b. The latter doublet lens 44b and the convex lens 46 are mounted in a dust-proof box 55 so as to maintain the second focusing screen 45 dust free. The second focusing screen 45 provides a field of the viewfinder as shown in FIG. 4, wherein two focusing areas 56 and 57 are printed or displayed in a central portion for indicating two rangefinding areas to be utilized for autofocusing. The focusing area 56 indicated by solid lines in the drawings is utilized for autofocusing a subject disposed in an ordinary subject distance range, that is, for instance, from 1 m to infinity. The second focusing area 57 indicated by dashed lines is utilized for autofocusing a subject at closer range, that is, from 30 cm to 1 m, in this instance.

These different focusing areas 56 and 57 are provided because the target points of the three rangefinding beams are different between the ordinary subject distance range and the nearer range, relative to the field of the viewfinder. This is because the AF light projection and reception windows 14 and 15 are spaced from the taking lens 11, and also because the horizontal and vertical parallax $PR_H$ and $PR_V$ between the optical path of the AF system and that of the taking lens changes with distance from the camera.

Figure 3:
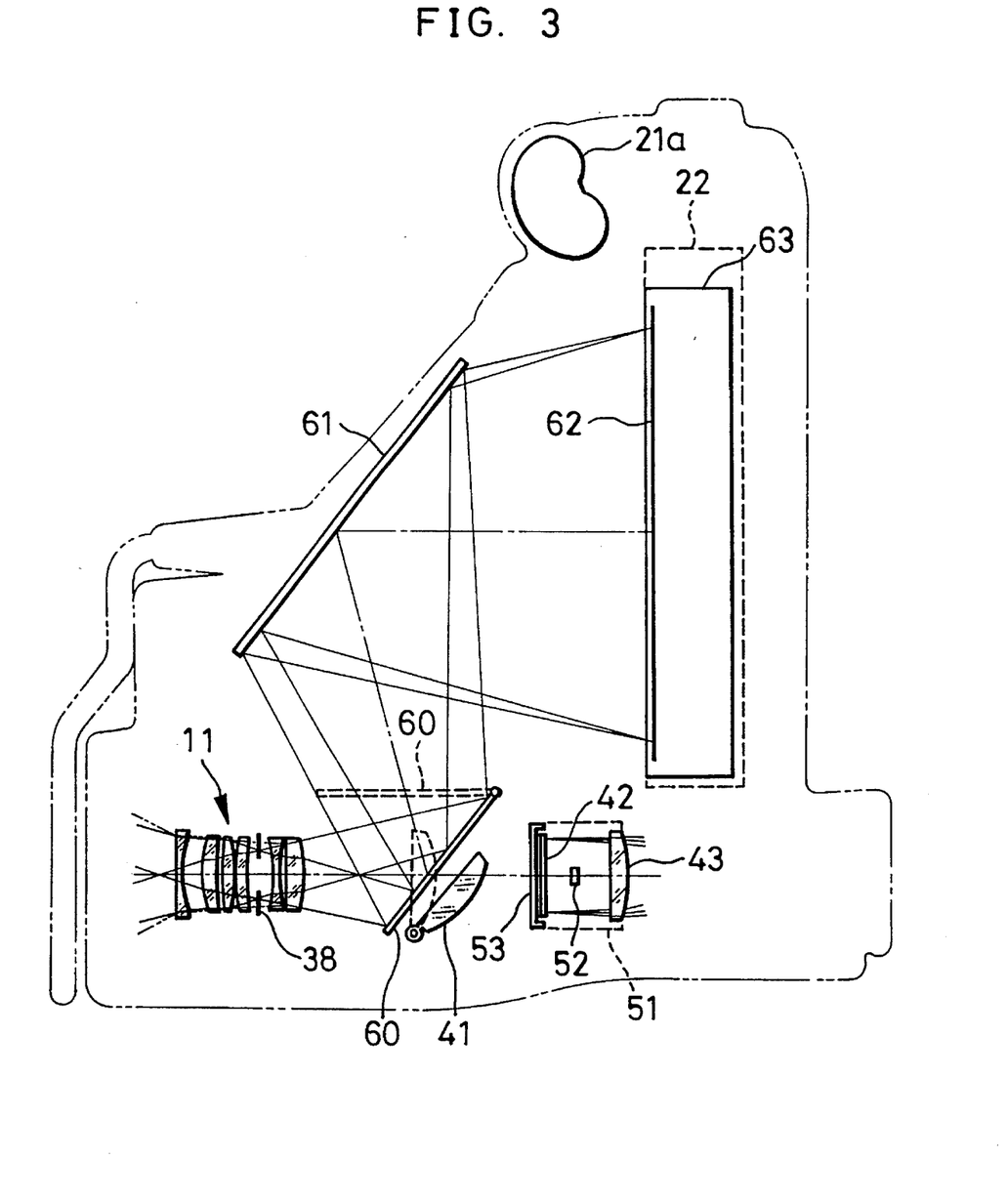
FIG. 3 is an explanatory view of the photographic optics of the single-lens reflex camera shown in FIG. 1.

In FIG. 3, a changeover mirror 60 is pivotally mounted behind the taking lens 11 and is usually displaced from the optical path so as to occupy the position shown by dashed lines in FIG. 3. Immediately after the shutter release button 20 is depressed, the changeover mirror 60 is swung into the position shown by solid lines in FIG. 3 so as to reflect the light passing through the taking lens 11 toward a large stationary mirror 61 to provide the photographic optical path having a Z-shaped optical axis. Simultaneously therewith, the conversion lens 41 is retracted from the optical path to the position shown by solid lines in FIG. 3.

The light reflected from the stationary mirror 61 is focused on a photosensitive surface of an instant film 62. Because the instant film 62 has a large image plane compared with a 35 mm film, the taking lens 11 of a standard lens system must have a long focal length, e.g., 148 mm, that is about three times the focal length necessary for the 35 mm film. Accordingly, the length of the photographic optical path should be about two or three times as long as for 35 mm film. The Z-shaped optical path of the photographic optics makes it possible to provide such a path long enough for the long focal length of the taking lens 11 in a compact fashion. The changeover mirror 60 and the conversion lens 41 are quickly returned to the initial positions shown by the dashed lines, upon completion of the exposure.

The instant films 62 are stacked in an instant film pack 63 and are pushed from the rear by the force of a spring. After the exposure, the exposed instant film 62 is pushed by a well-known claw member toward developing rollers. The developing rollers nip and feed the exposed film 62 to the outside of the camera. Thereby, the developing solution in the pods is spread out to develop the exposed film 62. When a predetermined time has elapsed, an image of the subject is reproduced or appears on the instant film 62.

The operation of the above-described camera is as follows:

Normally, the lens shutter 38 is open and the changeover mirror 60 is disposed in the optical path, so that the light reflected from the subject and passing through the taking lens 11 passes through the lens shutter 38 and is focused by the conversion lens 41 onto the first focusing screen 42. An image of the subject on the first focusing screen 42 is directed to the stationary mirror 48 through the relay lens 43. The stationary mirror 48 directs the image toward the stationary mirror 49 through the relay lens 44. The stationary mirror 49 reflects the image toward the second focusing screen 45. The image focused on the second focusing screen 45 is viewed through the convex lens 46 and the eyepiece 47. The viewfinder optics constitute an erect real image single-lens reflex viewfinder which enables the photographer to vie a very clear image of a subject.

The camera is normally set in the multi-beam autofocus mode, so that three infrared beams are projected from the AF light projection window 14 when the shutter release button 20 is depressed halfway. These beams are reflected from objects disposed in the focusing area 56 if the objects are in the ordinary subject distance range. The reflected light is received through the AF light reception window 15. The time-taken from light projection to light reception is counted by a quartz clock so as to calculate distance measurement data. Based on the distance measurement data, the focus lens driver 39 is driven to move the focusing lenses of the taking lens 11.

When the taking lens 11 is focused on an appropriate subject disposed in the focusing area, the taking lens 11 is locked at that focusing position unless the shutter release button 20 is reset to the initial position. Thereafter and optionally after reframing the photographic field, the shutter release button 20 is depressed to the full at an appropriate time. Then, a subject brightness is measured based on the subject light received through the AE light reception window 16. Simultaneously, the lens shutter 38 is closed, and the blind plate 53 is swung to shield the first focusing screen 42, while the conversion lens 41 is retracted from the optical path and the changeover mirror 60 is inserted in the optical path, as shown by the solid line in FIG. 3.

Immediately thereafter, the lens shutter 38 opens to pass the subject light through the taking lens 11 toward the changeover mirror 60. The subject light is reflected from the mirror 60 and then from the large stationary mirror 61 so that an image of the subject is made on the photosensitive surface of the instant film 62. During the exposure of the instant film 62, light entering through the eyepiece 47 and traveling through the viewfinder optics toward the changeover mirror 60 is prevented by the blind plate 53 from entering the photographic optical path through a gap between the changeover mirror 60 and the lens barrel 10.

The lens shutter 38 is closed at the end of an exposure time which is determined based on subject brightness data from the AE system, thereby completing an exposure of the instant film 62. Immediately thereafter, the changeover mirror 60, the conversion lens 41 and the blind plate 53 are pivotally reset to their initial positions. Thereafter, the lens shutter 38 is open to enable the photographer to view the image of the subject. The exposed instant film 62 is ejected by the developing rollers, and an unexposed instant film 62 is advanced to the exposure aperture of the film pack 63 under the spring force. In this way, a series of exposures can be made.

If the subject brightness is below a predetermined level, flash light is automatically projected from the flash emitting portion 24 toward the subject in the automatic flash mode. The amount of light from the light source of the flash emitting portion 24 is automatically controlled by a sensor disposed behind the light reception window 17 of the automatic flash system. However, when using flash light for photographing a subject in a close-up range, for example, in a subject distance range less than 60 cm, the instant film 62 will be overexposed even though the amount of light from the light source is controlled to be a minimum. Therefore, the diffusion plate 26 is placed in front of the light source so as further to reduce the light to a proper extent.

As described above, when photographing a subject closer than 1 m, the photographer should aim so that the subject will be in the second focusing area 57. The photographer can select the single-beam autofocus mode by depressing the SB-AF button 35 before and concurrently with depressing the shutter release button 20.

Autofocusing is effective in a range from 30 cm to infinity. It is possible to attach a close-up lens or the like to the front of the taking lens 11 so as to perform macro-photography at a higher magnification. At that time, the focus mode change switch 30 is operated to change the camera from the autofocus mode to the manual focus mode. In response to this changeover, the split micro prism 52 is inserted in the field of the viewfinder, so that the photographer can perform focusing by means of the focus ring 12 in the nearest range, that is, for example, from 30 cm to 9.5 cm. In the manual focus mode, the aperture size of the lens shutter 38 is automatically set to be the smallest size, e.g. f40, and also the built-in flash unit is automatically turned off. Instead, a synchronized flash signal may be outputted through a terminal, so that an external macro flash unit specific to macro-photograph may be utilized. If the external macro flash unit is attached to the camera, the camera is automatically changed over from the autofocus mode to the manual focus mode without the need for operating the focus mode change switch 30. Then, the built-in flash unit is turned off, and the aperture size of the lens shutter 38 is set at the low value f40.

Figure 5:
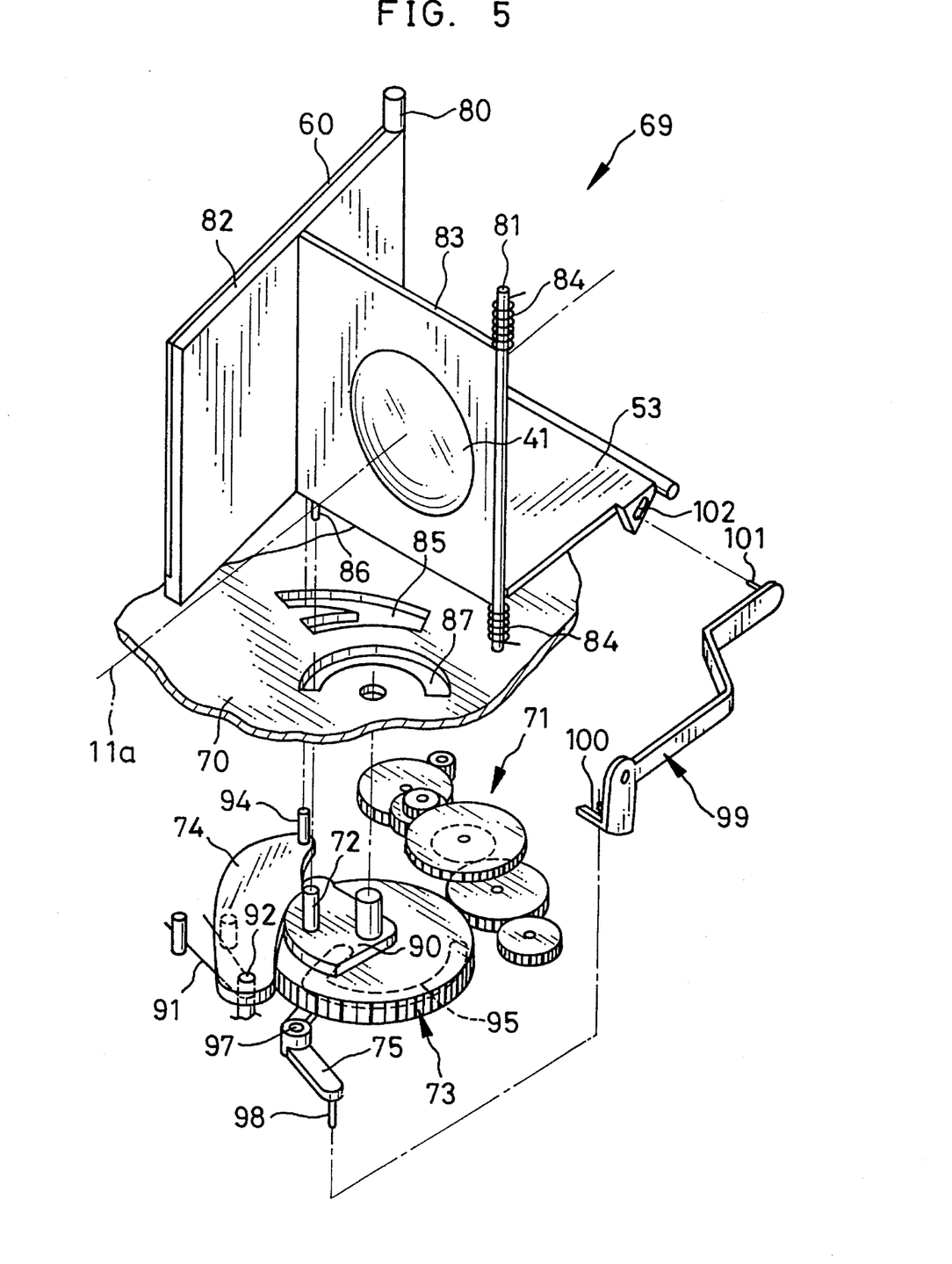
FIG. 5 is a fragmentary perspective view of a mechanism for pivotally moving a changeover mirror, a conversion lens and a blind plate, with the parts in the viewfinder position of the changeover mirror.
Figure 6:
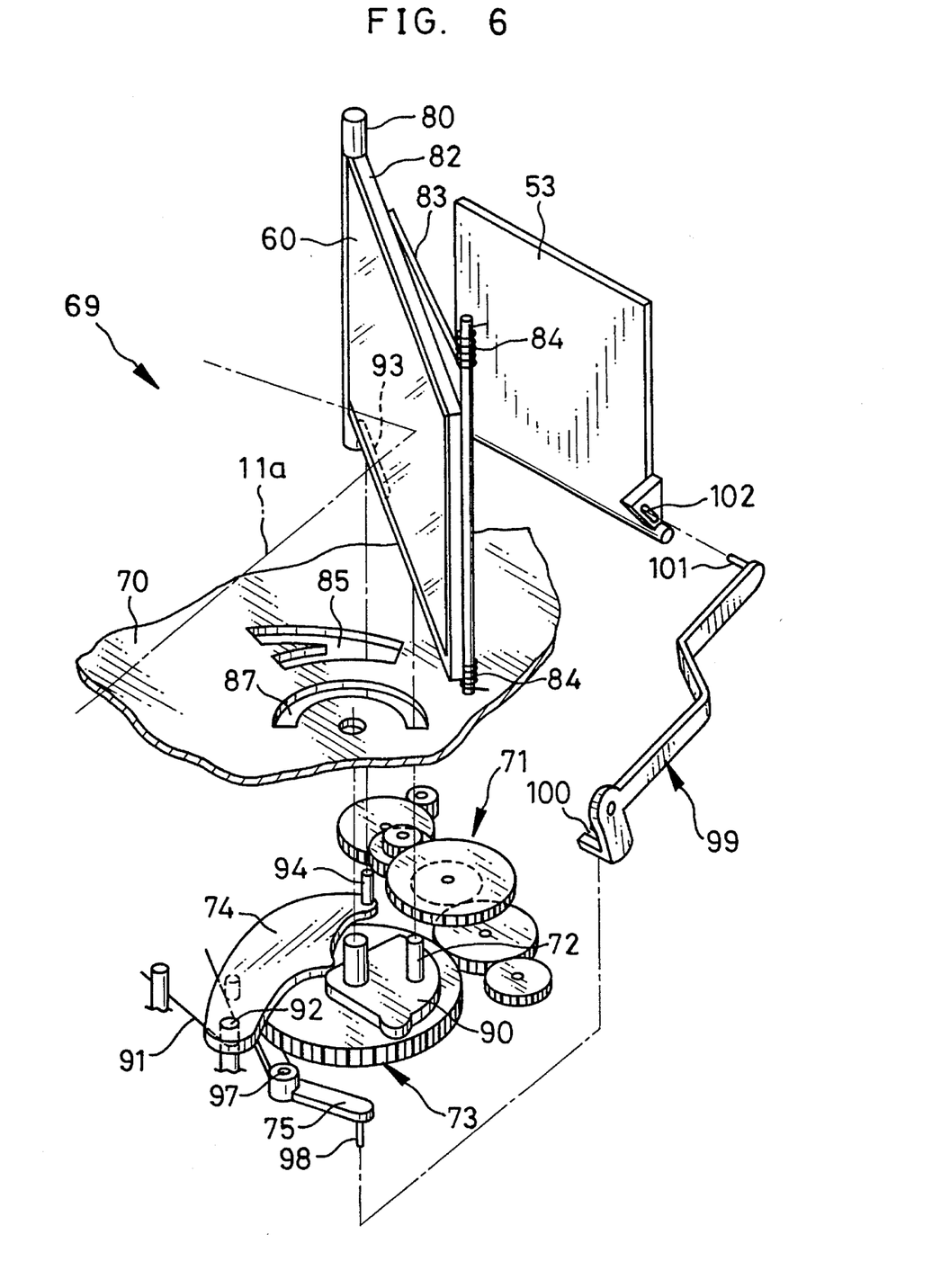
FIG. 6 is a view similar to FIG. 5 but with the parts in the photographic position of the changeover mirror.

The above-mentioned changeover mirror 60, the conversion lens 41 and the blind plate 53 are, for example, driven by a not-shown motor through a mechanism 69 as shown in FIGS. 5 and 6. In the mechanism 69, a base frame 70 is secured to the lens barrel 10. Below the base frame 70, a gear train 71 which is driven by the not-shown motor is coupled to a control cam 73. The movement of the control cam 73 is transmitted to the conversion lens 41 through a pin 72. Cam arms 74 and 75 are disposed on the top and bottom sides of the control cam 73 so as to move in cooperation therewith. The cam arm 74 transmits the movement of the control cam 73 to the changeover mirror 60, while the cam arm 75 transmits the movement of the control cam 73 to the blind plate 53.

A mirror frame 82 and a lens frame 83 respectively holding the changeover mirror 60 and the conversion lens 41 are disposed on the base frame 70 and are pivotable about respective axles 80 and 81. A spring 84 is mounted on the axle 81 to urge the lens frame 83 in a counterclockwise direction in FIG. 5. The lens frame 83 has a pin 86 integrally formed therewith and inserted in a Y-shaped slot 85 formed in the base frame 70. The pin 56 usually contacts an end of the Y-shaped slot 85 under the force of the spring 84, so that the conversion lens 41 is fixedly positioned on the optical axis 11a of the taking lens 11 in the viewfinder position shown in FIG. 5.

A semi-circular slot 87 is formed in base frame 70 beside the Y-shaped slot 85. A fan-shaped cam 90 is formed on the top of the control cam 73 integrally therewith. Cam 90 pushes the cam arm 74 against the force of a spring 91 to rotate the cam arm 74 about an axis 92. The pin 72 is implanted in the fan-shaped cam 90, and is engaged with the lens frame 83 through the semi-circular slot 87. Thereby, the pin 72 pushes the lens frame 83 to rotate against the force of the spring 84 when the control cam 73 is rotated in a clockwise direction in FIG. 5. The cam arm 74 also has a pin 94 which is engaged in a groove 93 (see FIG. 6) formed in the bottom edge of the mirror frame 82.

A cam groove 95 having a shape indicated by dashed lines in FIG. 5 is formed in the bottom surface of the control cam 73. An end of the cam arm 75 is engaged in the cam groove 95, so that a second end of the cam arm 75 is pivoted about an axle 97 when the control cam 73 is rotated. A pin 98 formed in the second end of the cam arm 75 is fitted in a cutout 100 formed in an end of a lever 99. A pin 101 is implanted in a second end of the lever 99, and is fitted in a slot 102 formed on one side of the blind plate 53. Therefore, the rotational movement of the control cam 73 is transmitted through the cam arm 75 and the lever 99 to the blind plate 53.

When the shutter button 20 is depressed, the lens shutter 38 is closed, and the not-shown motor is driven to rotate the control cam 73 in the clockwise direction through the gear train 71. Thereby, the blind plate 53 is pivoted in a clockwise direction in FIG. 5 through the cam arm 75 and the lever 99. The mirror frame 82 is pivoted in a counterclockwise direction because the cam arm 74 is pivoted in a clockwise direction under the force of the spring 91. The lens frame 83 is pushed by the pin 72 to pivot in the counterclockwise direction against the force of the spring 84.

When the conversion lens 41, the changeover mirror 60 and the blind plate 53 are moved to the photographic position shown in FIG. 6 in this way, the motor is stopped. In this position, the cam arm 74 is maintained in contact with the cam 90 under the force of the spring 91, so that the changeover mirror 60 is exactly placed in the photographic position wherein the Z-shaped photographic optical path is provided through the taking lens 11, the changeover mirror 60 and the stationary mirror 61. At that time, the bind plate 53 is inserted in the optical path of the viewfinder optics, so that the extraneous light that enters through the eyepiece 47 is shielded from the photographic optical path.

After the shutter 38 is opened and closed to expose the instant film 62 on the photographic optical path, the motor is driven to rotate in the opposite direction so as to rotate the control cam 73 in the counterclockwise direction through the gear train 71. Thereby, the cam arm 74 is pivoted in the counterclockwise direction against the force of the spring 91, pushing the mirror frame 82 by the pin 94 to swing the mirror frame 82 clockwise. The lens frame 83 is then released from the pin 72 to swing counterclockwise under the force of the spring 84. The control cam 73 also causes the cam arm 75 and the lever 99 to pivot to swing the blind plate 53 counterclockwise. When the conversion lens 41, the changeover mirror 60 and the blind plate 53 have thus moved back into the finder position shown in FIG. 5, the motor is stopped. Then, the shutter 38 is opened to permit viewing the image of the subject through the taking lens 11 and the viewfinder optics 41, 43, 48, 44, 49, 45, 46 and 47.

Although a preferred embodiment of the present invention has been described with reference to the drawings and several numerical values concerning the focal length of the taking lens and the subject distance range, the present invention is not limited to the above-described embodiment. For example, the split macro prism for use in manual focusing may be replaced by a split image prism or micro prisms.

Thus, various modifications of the present invention can be effected without departing from the spirit and scope of the appended claims.

What is claimed is:

1. A single-lens reflex camera comprising:

a taking lens;

a changeover mirror disposed behind said taking lens and movable between a photographic position on an optical path of said taking lens so as to reflect light passing through said taking lens and a viewfinder position displaced from said optical path;

a stationary mirror arranged to reflect the light from said changeover mirror toward a photographic film surface to surface to provide a photographic optical path in said photographic position of said changeover mirror;

a conversion lens mounted in the camera separately from said changeover mirror and movable into and out of the optical path of said taking lens, said conversion lens being disposed on said optical path of said taking lens while said changeover mirror is in said finder position;

real image viewfinder optics including an eyepiece, said viewfinder optics being disposed behind said changeover mirror and made effective when said conversion lens is disposed on said optical path of said taking lens; and a blind member mounted movably into and out of an optical path of said viewfinder optics, said blind member being disposed on the optical path of said viewfinder optics only when said changeover mirror is in said photographic position, so as to shield said photographic optical path from light that enters through said eyepiece.

2. A single-lens reflex camera as recited in claim 1, wherein said photographic film surface is a photosensitive layer of a sheet of monosheet-type instant film.

3. A single-lens reflex camera as recited in claim 1, wherein said photographic optical path has a Z-shape.

4. A single-lens reflex camera as recited in claim 1, wherein said changeover mirror, said conversion lens and said blind plate are driven conjointly by a drive mechanism.

5. A single-lens reflex camera as recited in claim 1, wherein said viewfinder optics form first and second focal planes.

6. A single-lens reflex camera as recited in claim 5, wherein first and second focusing screens are respectively disposed in said first and second focal planes, and are mounted in respective dust-proof boxes.

7. A single-lens reflex camera as recited in claim 5, further comprising:

a focusing mechanism for focusing said taking lens which is changeable between an autofocus mode and a manual focus mode; and a focus aid member which is disposed in one of said first and second focal planes so as to be viewed through said viewfinder optics in said manual focus mode.

8. A single-lens reflex camera as recited in claim 7, wherein said focus aid member is a split micro prism.

9. A single-lens reflex camera as recited in claim 7, wherein said focusing mechanism comprises a manual focusing ring disposed in front of said taking lens, and a lens protector disposed in front of said focusing ring.

10. A single-lens reflex camera as recited in claim 7, wherein said focusing mechanism is effective in a subject distance range from 30 cm to infinity in said autofocus mode.

11. A single-lens reflex camera as recited in claim 6, further comprising first and second target marks provided on one of said first and second focusing screens for indicating first and second focusing areas in a field of view of said camera, said first target mark being used for autofocusing on a subject disposed in a range beyond 1 m, said second target mark being used for autofocusing on a subject disposed in a range nearer than 1 m.

12. A single-lens reflex camera as recited in claim 7, further comprising a built-in flash unit which is automatically turned off when said focusing mechanism is set in said manual focus mode.

13. A single-lens reflex camera as recited in claim 7, wherein said taking lens is automatically set in a small aperture size when said focusing mechanism is set in said manual focus mode.

14. A single-lens reflex camera as recited in claim 12, further comprising a diffusion plate which is automatically set to reduce the amount of light projected from said built-in flash unit in said autofocus mode, when photographing a subject disposed in a close-up range nearer than a predetermined distance from said camera.

15. A single-lens reflex camera comprising:

a lens barrel offset horizontally to one side of said camera to hold a taking lens;

a grip offset horizontally to the opposite side of said camera from said lens barrel;

a changeover mirror disposed behind said taking lens and movable between a photographic position on an optical path of said taking lens so as to reflect light passing through said taking lens and a viewfinder position displaced from said optical path;

a stationary mirror arranged to reflect the light from said changeover mirror toward a photographic film surface to provide a photographic optical path in said photographic position of said changeover mirror;

a conversion lens mounted in the camera separately from said changeover mirror and movable into and out of the optical path of said taking lens, said conversion lens being disposed on said optical path of said taking lens while said changeover mirror is in said finder position;

real image viewfinder optics including an eyepiece, said viewfinder optics being disposed behind said changeover mirror and made effective when said conversion lens is disposed on said optical path of said taking lens; and a blind member mounted movably into and out of an optical path of said viewfinder optics, said blind member being disposed on the optical path of said viewfinder optics only when said changeover mirror is in said photographic position, so as to shield said photographic optical path from light that enters through said eyepiece.

16. A single-lens reflex camera as recited in claim 15, wherein said photographic film surface is a photosensitive layer of a sheet of monosheet type instant film.

17. A single-lens reflex camera as recited in claim 15, wherein said photographic optical path has a Z-shape.

18. A single-lens reflex camera as recited in claim 15, wherein said viewfinder optics form first and second focal planes, and first and second focusing screens, which are respectively disposed in said first and second focal planes, are mounted in respective dust-proof boxes.

19. A single-lens reflex camera as recited in claim 18, further comprising:

a focusing mechanism for focusing said taking lens which is changeable between an autofocus mode and a manual focus mode; and a focus aid member which is disposed in one of said first and second focal planes so as to be viewed through said viewfinder optics in said manual focus mode.

20. A single-lens reflex camera as recited in claim 19, wherein said focus aid member is a split micro prism.

21. A single-lens reflex camera as recited in claim 19, wherein said focusing mechanism comprises a manual focusing ring disposed in front of said taking lens, and a lens protector disposed in front of said focusing ring.

22. A single-lens reflex camera as recited in claim 21, further comprising a diffusion plate which is automatically set to reduce the amount of light projected from said built-in flash unit in said autofocus mode, when photographing a subject disposed in a close-up range nearer than a predetermined distance from said camera.

23. A single-lens reflex camera as recited in claim 19, wherein when said focusing mechanism is set in said manual focus mode, a built-in flash unit is turned off, and said taking lens is set to a small aperture size.

* * * * *